3,309,366
IMIDAZOLE(1,2)-s-TRIAZINES
Hans Schläpfer, Basel, and Jakob Bindler, Riehen, Switzerland, assignors to J. R. Geigy A.G., Basel, Switzerland
No Drawing. Filed Mar. 23, 1964, Ser. No. 354,152
Claims priority, application Switzerland, Apr. 5, 1963, 4,401/63
13 Claims. (Cl. 260—249.6)

The present invention concerns a new process for the production of condensed heterocycles.

It has been found that condensed heterocycles are obtained by reacting a compound of the formula

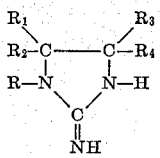

the tautomeric form of which is

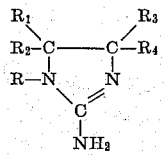

with a compound, which may be tautomeric, of the formula

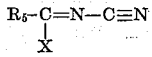

to form a tautomeric imidazole (1,2)-s-triazine compounds of the isomeric formulas

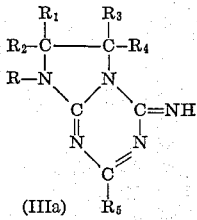 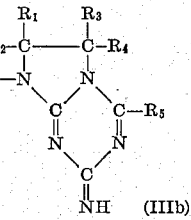

wherein R and $R_5$, independently of each other, represent hydrogen or a hydrocarbon radical which may be substituted, particularly an alkyl, cycloalkyl, aralkyl or a possibly substituted aryl group and, in addition, $R_5$ also represents the primary amino group, each of $R_1$, $R_2$, $R_3$ and $R_4$ independently represents hydrogen or a monovalent substituent and $R_1$ and $R_3$ together with the two carbon atoms in the ring represent a saturated ring or $R_1$, $R_2$, $R_3$ and $R_4$ together with the two carbon atoms in the ring represent an unsaturated ring, X represents the primary, a secondary or tertiary amino group or a group —O—$R_6$ or —S—$R_6$, and $R_6$ represents an alkyl, cycloalkyl, aralkyl or a possibly substituted aryl group.

When $R_5$ represents the primary amino group, the compounds of Formulae IIIa and IIIb are uniform; if $R_5$ is hydrogen or a possibly substituted hydrocarbon radical, then the isomers of Formulae IIIa and IIIb are formed.

If R and $R_5$ in the above formulae represent an alkyl group then this is in particular an alkyl group having 1 to 20 carbon atoms in a straight or branched chain, which alkyl group can also contain hetero atoms such as O, N, S, or halogens (e.g. fluorine, chlorine or bromine). If R and $R_5$ are a cycloalkyl group then they are, for example, the cyclohexyl group; if they are an aralkyl group then they are, e.g. the benzyl group; if they are a possibly substituted aryl group then they are, for example, a phenyl group substituted by halogens such as fluorine, chlorine or bromine or by a low alkyl or alkoxy group.

As monovalent substituents, $R_1$, $R_2$, $R_3$ and $R_4$ preferably represent hydrocarbon radicals, in particular low alkyl groups having, for example 1 to 4 carbon atoms. If $R_1$ and $R_3$ together with the two ring carbon atoms represent a saturated ring, then this is, in particular, the cyclohexane ring; if $R_1$, $R_2$, $R_3$ and $R_4$ together with the two ring carbon atoms represent an unsaturated ring, then this is, e.g. a benzene ring which can contain halogens such as chlorine or bromine, low alkyl groups such as the methyl or ethyl group or low alkoxy groups such as the methoxy or ethoxy group.

If X in Formula II is a secondary or tertiary amino group, then preferably hydrocarbon radicals are N-substituents, chiefly low alkyl groups having up to 4 carbon atoms. If X is a tertiary amino group then, in addition, it can be the radical of a cyclic amine, e.g. the N-piperidino or N-morpholino group. If X in Formula II is an $R_6$—O— or $R_6$—S— group, then $R_6$ is a low alkyl group having, e.g. 1 to 4 carbon atoms, a cycloalkyl group such as the cyclohexyl group, an aralkyl group such as the benzyl group or a possibly substituted aryl group, e.g. the phenyl group or a phenyl group substituted by halogen, low alkyl or low alkoxy groups.

A great number of the 2-iminoimidazolidines of Formula I used as starting materials are known. They are obtained, for example, by reacting cyanogen chloride with correspondingly substituted diamines. Suitable 2-iminoimidazolidines are, for example, 1-methyl-, 1-ethyl-, 1-propyl-, 1-n-butyl-, 1-sec.butyl-, 1-isobutyl-, 1-amyl-, 1-hexyl-, 1-octyl-, 1-decyl-, 1-dodecyl-, 1-tetradecyl-, 1-hexadecyl-, 1-octadecyl-, 1-eicosyl-, 1-cyclohexyl-, 1-benzyl-, 1-phenyl-, 1-(mono- or poly-chloro- or -bromo-phenyl)-, 1-(mono- or poly- methyl-, -ethyl-, -methoxy- or -ethoxy-phenyl)-2-iminoimidazolidine or 4- or 5-methyl-, 4- or 5-ethyl-, 4- or 5-cyclohexyl-, 4- or 5-benzyl-, 4- or 5-phenyl- or 4,5-dimethyl- or 4,5-tetramethylene-2-iminoimidazolidine. Preferably the easily accessible 2-iminoimidazolidine is used.

The greater number of the compounds of Formula II to be reacted therewith is known or they can be produced by known methods. Depending on the meaning of $R_5$ and X they fall into different sub-groups. If $R_5$ is hydrogen or a possibly substituted hydrocarbon radical, then they are N-cyanocarboxylic acid amidines if X is the primary or secondary or tertiary amino group, or they are N-cyanocarboxylic acid iminoethers and iminothioethers if X is a group —O—$R_6$ or —S—$R_6$. If $R_5$ is the primary amino group, they are cyanoguanidines if X is the primary or a secondary or tertiary amino group, e.g. the dicyanodiamide, or they are N-cyanoisourea ethers or isothiourea ethers if X is the group —O—$R_6$ or —S—$R_6$.

If imidazo(1,2)-s-triazine compounds of Formula IIIa or IIIb are to be produced in which $R_5$ is the primary amino group, preferably the easily accessible dicyanodiamide is used as compound of Formula II. In all other cases, preferably the corresponding N-cyanocarboxylic acid amidines are used.

The reaction partners of Formulae I and II are reacted by melting the components together or in solvents. The former method is applicable mainly on using cyanoguanidines as compounds of Formula II. In this reaction, N-unsubstituted 2-iminoimidazolidines of Formula I are preferably used as bases; the N-substituted compounds are used in the form of their salts, particularly the hydrohalides, e.g. the hydrochlorides or hydrobromides.

The preferred method of performing the reaction is in an organic solvent, e.g. in alkanols, particularly in butanol, in glycols and their mono- and di-ethers, e.g. in ethylene glycol or in ethylene glycol mono- or di-methyl or -ethyl ether, or also in cyclohexanol. The reaction temperature is between about 70 and 200° C. If necessary, the reaction is performed in a closed vessel under pressure.

The end products are isolated and purified by crystallising out after they have previously been converted, if necessary, into their salts with acids, for example into the nitrates or hydrochlorides.

The imidazo(1,2)-s-triazine compounds of Formulae IIIa and IIIb are colourless basic compounds, the greater number of which melt with decomposition. They can be used as bactericides or as gas fading inhibitors. "Gas fading inhibitors" are substances which reduce or prevent completely the fading of color from dyed materials, particularly of dyed viscose rayon materials, due to oxidizing gas fumes, which phenomenon is known to the art as "gas-fading."

The process according to the invention for the production of compounds of Formulae IIIa and IIIb has the advantage over previously known processes of greater simplicity and it offers a wider choice of substituents.

The following examples illustrate the invention. Where not otherwise stated, parts are given as parts by weight. The temperatures are in degrees centigrade. The relationship of parts by weight to parts by volume is as that of grammes to cubic centimetres.

*Example 1*

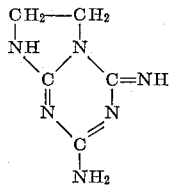

85 parts of 2-imino-imidazolidine are melted in a vessel fitted with a stirrer in an oil bath. The exterior temperature is 110–120°. 84 parts of dicyanodiamide are added in portions to the melt while stirring. The whole is stirred at the same bath temperature until a clear melt is attained. The oil bath temperature is then raised to 160° and stirring is discontinued as soon as splitting off of ammonia begins with bubble formation. After a short time the reaction takes place and there is a sharp rise in temperature up to about 230°. On completion of the reaction, the distended solid reaction mass is broken up into small pieces and slurried with 1000 parts of water. Acetic acid is added to the suspension until there is a permanent acid reaction to litmus paper and the precipitate has dissolved. Insoluble particles are filtered off and then the filtrate is cooled and 30% sodium hydroxide solution is added thereto while stirring until there is a weakly alkaline reaction to mimosa paper, whereupon the white reaction product precipitates. It is filtered off, washed with cold water and dried in vacuo at 40–50°.

95 parts of imidazo(1,2)-s-triazine compound of the formula given above are obtained. The compound contains 1 mol of crystal water and the yield corresponds to 56% of the theoretical.

The nitrate of this base produced in the usual way melts at 317° with decomposition.

*Analysis*: [$C_5H_8N_6+HNO_3$] (molecular weight: 215.18). Calculated: C, 27.91; H, 4.21; N, 45.57. Found: C, 27.77; H, 4.16; N, 45.34.

If, instead of dicyanodiamide, the equivalent amounts of N-ethyldicyanodiamide or N,N-diethyldicyanodiamide are used and otherwise the procedure given in the example is followed, then equally good yields of the same compound are obtained while splitting off ethylamine or diethylamine respectively.

*Example 2*

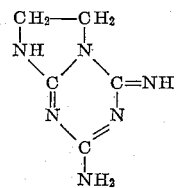

85 parts of 2-imino-imidazolidine are dissolved while stirring in 400 parts of n-butanol at 60–70°. 85 parts of dicyanodiamide are then added to the solution and the reaction temperature is slowly raised to 110–115° whereupon the dicyanodiamide is gradually dissolved and shortly afterwards the reaction product begins to separate out and ammonia is developed. The reaction mixture is stirred for 10 hours at 110–115° then allowed to cool to about 40° while stirring and the solid product is filtered off. Adhering mother liquor is removed from the product by washing it several times with methanol and drying in vacuo at 60–70°.

138 parts, corresponding to a yield of 85.8% of the theoretical, of imidazo(1,2)-s-triazine compound of the above constitution are obtained as a white, finely crystalline product the degree of purity of which, determined titrimetrically, is 94.5%. M.P. 309–311° (decomposition).

If in the above example, instead of the 85 parts of dicyanodiamide, the equivalent amount of N-cyano-O-ethyl-isourea, N-cyano-S-methyl-isothiourea, N-ethyldicyanodiamide, N-phenyldicyanodiamide or N,N-diethyldicyanodiamide is used and otherwise the procedure described in the example is followed, then the same imidazo(1,2)-s-triazine compound is obtained in a yield of 65%, 62.5%, 59.5%, 50.0% or 70.0% of the theoretical respectively.

*Example 3*

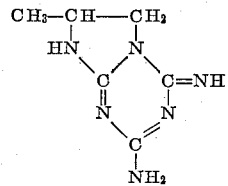

74 parts of 4-methyl-2-imino-imidazolidine are dissolved while stirring in 400 parts of ethylene glycol monomethyl ether at 65° and then 66 parts of dicyanodiamide are gradually added. When it has all dissolved, the solution is heated for 10 hours at 110–120°. The reaction mixture is then cooled, while stirring, to 35–40° and the white crystallised product is filtered off, washed with ethanol until the washing water no longer has a phenolphthalein alkaline reaction and then dried in vacuo at 60–70°.

76 parts, corresponding to a yield of 61.5% of the theoretical, of imidazo(1,2)-s-triazine compound of the above formula are obtained. M.P. 281–283° with decomposition. Neutralisation equivalent: 166 (calculated: 166).

The nitrate produced in the usual way melts at 297° with decomposition.

*Analysis*: [$C_6H_{10}N_6+HNO_3$] (molecular weight: 229.20). Calculated: C, 31.44; H, 4.84; N, 42.78. Found: C, 31.59; H, 5.08; N, 42.75.

If, in the same method, instead of dicyanodiamide, the equivalent amount of N-cyano-O-methyl-isourea or N-cyano-S-methyl-isothiourea is used, then the same imidazo-(1,2)-s-triazine compound is obtained in equally good yields.

If, instead of the 74 parts of 4-methyl-2-imino-imidazoliline, the equivalent amount of 4,5-tetramethylene-2-imino-imidazolidine produced from cis or trans 1,2-diaminocyclohexane and cyanogen chloride, is used and otherwise the procedure given in the example is followed, then imidazo-(1,2)-s-triazine compound of the formula

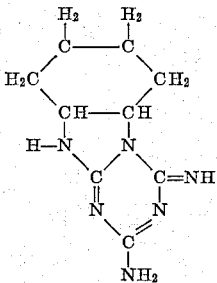

is obtained.

Example 4

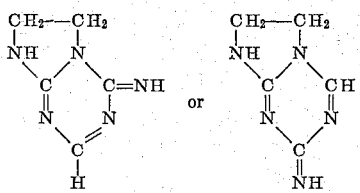

22.8 parts of 2-imino-imidazolidine are dissolved in 125 parts of n-butanol. 18.5 parts of N-cyanoformamidine are added to the solution and the whole is heated for half an hour at 100° while stirring. On heating, the N-cyanoformamidine quickly dissolves and at the same time ammonia begins to split off. After a short time the reaction product begins to separate out in the form of fine crystals. After about 1½ hours' stirring at 100–110°, practically no more ammonia is developed. After about 3 hours reaction time, the reaction mixture is cooled, while stirring, the product is removed, washed with ethanol and dried in vacuo at 50 to 60°. 19 parts, corresponding to a yield of 47.5% of the theoretical, of the above imidazo-(1,2)-s-triazine compound are obtained, the degree of purity of which, titrimetrically determined, is 91.5%. After recrystallisation from a mixture of water and ethanol in a volume ratio of 1:2, the base melts at 235° with decomposition.

The nitrate produced in the usual way and recrystallised from water melts at 245–246° with decomposition.

Analysis: $[C_5H_7N_5+HNO_3]$ (molecular weight: 200.16). Calculated: C, 30.0; H, 4.03; N, 41.99. Found: C, 30.04; H, 4.09; N, 41.98.

If, instead of the 18.5 parts of N-cyanoformamidine, 38.8 parts of N-cyanobenzamidine are used and otherwise the procedure described in the example is followed, then a yield of 30.7% of the compound of the formula

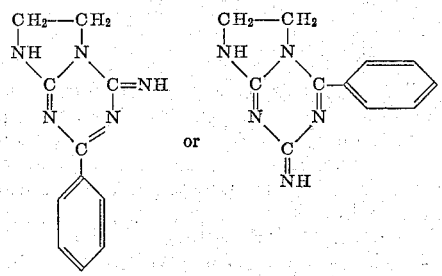

is obtained. M.P. 285–287° with decomposition.

Example 5

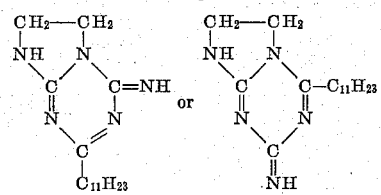

22 parts of N-cyanolauramidine (M.P. 90.5° to 91°) are added, while stirring, to a solution of 8.5 parts of 2-imino-imidazolidine in 110 parts of n-butanol and the reaction mixture is heated for 6 hours at 100–110°, a great amount of ammonia being developed. The solvent is then evaporated off in vacuo, the residue is suspended in 150 parts of water and hydrochloric acid is added until the reaction is weakly acid to congo paper, whereupon a clear, foaming solution is formed. 30% sodium hydroxide solution is then added to the solution while stirring until the reaction is weakly alkaline to mimosa paper. The oil which separates is immediately taken up in a mixture of 300 parts of diethyl ether and 100 parts of ethanol, the oil is carefully separated and the solvents are carefully distilled off in vacuo. The semi-solid residue is dissolved by heating in 120 parts of isopropanol and then left to crystallise. The crystals formed are isolated after 24 hours, washed with isopropanol and dried in vacuo at 60–70°. Yield: 6.7 parts of the compound of the constitution given above. On concentrating the mother lye and again crystallising, an additional 5 parts of the base can be obtained, M.P. 156–157°. Total yield 11.7 parts, corresponding to a yield of 40% of the theoretical.

For analysis, the end product is again recrystallised from isopropanol. M.P. 156.5–157.5° with partial decomposition.

Analysis: $C_{16}H_{29}N_5$ (molecular weight 291.43). Calculated: C, 65.94; H, 10.03; N, 24.03. Found: C, 65.78; H, 9.80; N, 23.77.

Eaxmple 6

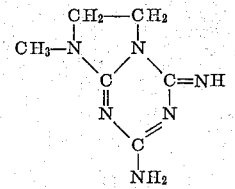

A mixture of 81 parts of 1-methyl-2-imino-imidazolidine hydrochloride and 53 parts of dicyanodiamide is placed in portions, while stirring, in a vessel fitted with a thermometer and stirrer in a 165° hot oil bath. On completion of the addition, the melt is stirred for 1 hour whereupon the inner temperature rises from 125 to 160° and the previously thinly liquid and clear melt begins to go turbid and ammonia is developed. The oil bath temperature is raised to 170 to 175° and stirring is continued for one hour whereupon the reaction mass becomes increasingly thick so that finally stirring has to be discontinued. Finally, the melt is left for 4 hours in a 180–185° hot oil bath, after which time practically no more ammonia is developed. After cooling, the completely solid reaction mass is dissolved in 400 parts of hot water and the reaction is made acid to litmus paper with hydrochloric acid. The mixture is filtered and the product is left to crystallise. The crystals are isolated, washed with a little water and dried in vacuo at 40–50°. 63 parts of the hydrochloride of imidazo(1,2)-s-triazine compound of the above formula $[C_6H_{10}N_6 \cdot HCl \cdot H_2O]$ are obtained. On concentrating the mother lye and crystallising out, an additional 35 parts of the hydrochloride mentioned are obtained. Total yield: 98 parts of hydrochloride, corresponding to a yield of 74% of the theoretical.

To produce the free base, 22 parts of this hydrochloride are dissolved in 100 parts of 60° warm water, 14 parts of 30% sodium hydroxide solution are added, the whole is immediately cooled whereupon the base separates in the form of small fine needles. After isolating, washing with ice water and drying in vacuo at 40–45°, 13.5 parts (81%) of the free base are obtained, M.P. 288–289° with decomposition. Neutralisation equivalent: 166 (calculated 166).

For analysis, the base is again recrystallised from water.

Analysis: $C_6H_{10}N_6$ (molecular weight 166.19). Calculated: C, 43.36; H, 6.07; N, 50.57. Found: C, 43.59; H, 6.37; N, 50.40.

The nitrate produced from the base melts at 298–299° with decomposition.

If, instead of the 81 parts of 1-methyl-2-imino-imidazolidine hydrochloride an equivalent amount of each of the 2-imino-imidazolidine hydrochlorides given in column II are used and otherwise the procedure given in the example is followed, then correspondingly substituted imidazo(1,2)-s-triazine compounds are obtained in the yields given in column III, the melting points of which are given in columns IV and V.

[1,2-a]-s-triazine compound melts at 277° with decomposition.

We claim:

1. A compound selected from the group consisting of compounds of the formulas

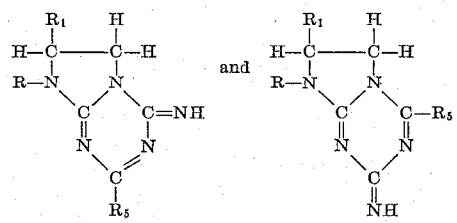

TABLE

| I No. | II R | $R_1$ | $R_2$ | $R_3$ | $R_4$ | III Yield, percent | IV M.P. of the free base, °C. | V M.P. of the nitrate, °C. with decomposition |
|---|---|---|---|---|---|---|---|---|
| 7 | H | H | H | H | H | 73 | 311–313 | 317 |
| 8 | H | —CH₃ | H | H | H | 65 | 281–282 | 297 |
| 9 | —C₁₂H₂₅ | H | H | H | H | 35 | 202–203 | [1] 275–278 |
| 10 | —⟨phenyl⟩ | H | H | H | H | 46 | 263–264 | 274–275 |
| 11 | —⟨phenyl⟩—Cl | H | H | H | H | 61 | 270–271 | 272–273 |
| 12 | —⟨phenyl with Cl, Cl⟩ | H | H | H | H | 45 | 266–267 | 284 |
| 13 | —CH₂—⟨phenyl⟩ | H | H | H | H | 37 | 253–254 | 246–247 |
| 14 | —⟨cyclohexyl⟩ | H | H | H | H | 37 | 243–244 | 279–280 |

[1] Hydrochloride.

By using, instead of the 81 parts of 1-methyl-2-imino-imidazolidine hydrochloride, the equivalent amount of 2-iminobenz-imidazolidine and otherwise following the procedure given in the preceding example, then the correspondingly substituted imidazo(1,2)-s-triazine, of the formula

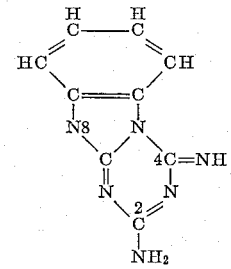

is obtained in a yield of 42% of the theoretical. In the form of its nitrate, this 2-amino-4-imino-benzimidazo [1,2-a]-s-triazine.

wherein R represents a member of the group consisting of hydrogen, alkyl of from 1 to 12 carbon atoms, phenyl, chlorophenyl, benzyl and cyclohexyl, $R_1$ represents hydrogen or lower alkyl, and $R_5$ represents a member of the group consisting of amino, phenyl and alkyl of from 1 to 20 carbon atoms.

2. 2-amino-4-imino-imidazo[1,2-a]-s-triazine.

3. 2 - amino - 4-imino-7-methyl-imidazo-[1,2-a]-s-triazine.

4. 2-phenyl-4-imino-imidazo[1,2-a]-s-triazine.

5. 2-undecyl-4-imino-imidazo-[1,2-a]-s-triazine.

6. 2 - amino - 4 - imino-8-dodecyl-imidazo-[1,2-a]-s-triazine.

7. 2 - amino - 4 - imino-8-phenyl-imidazo-[1,2-a]-s-triazine.

8. 2 - amino - 4 - imino-8-(4′-chlorophenyl)-imidazo-[1,2-a]-s-triazine.

9. 2 - amino - 4 - imino-8-(3′,4′-dichlorophenyl)-imidazo-[1,2-a]-s-triazine.

10. 2 - amino - 4 - imino-8-benzyl-imidazo-[1,2-a]-s-triazine.

11. 2 - amino - 4 - imino-8-cyclohexyl-imidazo[1,2-a]-s-triazine.

12. 8 - methyl - 2 - amino-4-imino-imidazo-[1,2-a]-s-triazine.

13. 2 - amino - 4 - imino-benzimidazo-[1,2-a]-s-triazine.

References Cited by the Examiner

Ostrogovich: Chem. Abstracts, vol. 5, p. 2099 (1911).

Schaefer: J. Am. Chem. Soc., vol. 77, pp. 5922–5 (1955).

Hinkins et al.: Chem. Abstracts, vol. 55, p. 17644f (1961).

Smolin: "s-Triazines and Derivatives," Interscience Pub. Inc., New York, p. 230 (1959).

WALTER A. MODANCE, *Primary Examiner.*

JOHN M. FORD, *Assistant Examiner.*